(12) United States Patent
Shi (10) Patent No.: US 12,360,572 B1
(45) Date of Patent: Jul. 15, 2025

(54) GRAPHICS CARD SUPPORT ASSEMBLY AND COMPUTER CASE CONTAINING WITH GRAPHICS CARD SUPPORT ASSEMBLY

(71) Applicant: HeXin Shi, Shaoyang (CN)

(72) Inventor: HeXin Shi, Shaoyang (CN)

( * ) Notice: Subject to any disclaimer, the term of this patent is extended or adjusted under 35 U.S.C. 154(b) by 0 days.

(21) Appl. No.: 19/064,988

(22) Filed: Feb. 27, 2025

(51) Int. Cl.
*G06F 1/16* (2006.01)

(52) U.S. Cl.
CPC ................................. *G06F 1/1658* (2013.01)

(58) Field of Classification Search
CPC ...... G06F 1/1658; H05K 5/02; H05K 5/0217; H05K 5/0269; H05K 5/0286; H05K 7/1402; H05K 7/1424; H05K 7/1427
See application file for complete search history.

(56) References Cited

U.S. PATENT DOCUMENTS

| | | | | |
|---|---|---|---|---|
| 4,277,120 A | * | 7/1981 | Drake | H05K 7/1425 361/756 |
| 4,426,675 A | * | 1/1984 | Robinson | H05K 7/1424 361/212 |
| 10,973,139 B1 | * | 4/2021 | Tsorng | H05K 7/1424 |
| 11,966,352 B2 | * | 4/2024 | Lin | G06F 13/4221 |
| 2023/0071666 A1 | * | 3/2023 | Hartouniyan | H05K 5/0226 |
| 2023/0176631 A1 | * | 6/2023 | Zhang | G06F 1/183 361/679.02 |
| 2023/0376084 A1 | * | 11/2023 | Kartadinata | H05K 5/0286 |
| 2024/0057280 A1 | * | 2/2024 | Ma | H05K 7/20154 |
| 2024/0176398 A1 | * | 5/2024 | Tsorng | G06F 13/4022 |
| 2025/0048579 A1 | * | 2/2025 | Chen | G06F 1/187 |

* cited by examiner

*Primary Examiner* — Daniel J Rohrhoff
(74) *Attorney, Agent, or Firm* — JEEN IP LAW, LLC (57) ABSTRACT

A graphics card support assembly is provided, which includes a first support assembly and a second support assembly. The first support assembly includes a first support member and a second support member fixedly connected to one side of the first support member. Two ends of the second support member are provided with first expansion plates, each of which is provided with at least two first threaded holes; the second support assembly includes a third support member and a fourth support member connected to the third support member to form an "L"-shaped structure. The fourth support member extends from the first expansion plates to form a second expansion plate, which is provided with second threaded holes; the first support assembly and the second support assembly are movably connected by bolts passing through the first threaded hole and the second threaded holes.

9 Claims, 9 Drawing Sheets

GRAPHICS CARD SUPPORT ASSEMBLY AND COMPUTER CASE CONTAINING WITH GRAPHICS CARD SUPPORT ASSEMBLY

TECHNICAL FIELD

The present disclosure relates to the field of computer case technologies, and in particular, to a graphics card support assembly and a computer case containing the graphics card support assembly.

BACKGROUND

A graphics card is one of the basic components of a computer, which converts the display information required by the computer system to drive the display, and provides row by row or interlaced scanning signals to the display, thereby controlling the correct display of the display. It is an important component that connects the display and the personal computer motherboard. The existing graphics card is plugged into the motherboard. To ensure the heat dissipation of the graphics card, a fan is added to the graphics card. The weight of the fan and graphics card causes deformation and bending at a connection between the graphics card and motherboard.

SUMMARY

To solve the problem of deformation and bending at a connection between a graphics card and a motherboard caused by the weight of the fan and graphics card when adding the fan to the graphics card, the present disclosure provides a graphics card support assembly, including: a first support assembly, which includes a first support member and a second support member fixedly connected to one side of the first support member, two ends of the second support member are provided with first expansion plates, and each first expansion plate is provided with at least two first threaded holes; and a second support assembly, which includes a third support member and a fourth support member connected to the third support member to form an "L"-shaped structure; the fourth support member extends a second expansion plate corresponding to the first expansion plates, and the second expansion plate is provided with second threaded holes; where the first support assembly and the second support assembly are movably connected by bolts passing through the first threaded holes and the second threaded holes.

In some embodiments of the present disclosure, the first threaded holes on the first expansion plates at two ends are symmetrically arranged.

In some embodiments of the present disclosure, there are 3-5 first threaded holes that are equidistantly arranged on the first expansion plates at two ends.

In some embodiments of the present disclosure, the second support assembly is connected to the first support assembly in a "⏋" direction or a "⏌" direction.

In some embodiments of the present disclosure, the first support member is provided with a fixed hole, and the first support member is fixedly connected to a computer case through the fixed hole.

In some embodiments of the present disclosure, the second support member is provided with a recess, and the recess is provided with a third threaded hole.

In some embodiments of the present disclosure, the third support member is symmetrically provided with two sets of connection holes with a spacing of 3 cm to 7 cm.

In some embodiments of the present disclosure, a third expansion plate is provided on two sides of the third support member perpendicular to the same plane as the third support member.

In some embodiments of the present disclosure, the second support assembly is an integral formed profile bent to form the third support member, the fourth support member, the second expansion plate, and the third expansion plate; the third expansion plate is provided with a fourth threaded hole.

A computer case includes the aforementioned graphics card support assembly.

The beneficial effects of the present disclosure are reflected in that the graphics card support assembly is provided at one end of the graphics card on the computer case, thereby playing a role in supporting the graphics card, and the second support assembly is movably connected to the first support assembly so that the graphics card support assembly can adapt to graphics cards of different specifications. A problem of deformation and bending at a connection between the graphics card and a motherboard due to the weight of the fan and graphics card when adding the fan to the graphics card can be solved.

Numeral reference: 1—first support assembly; 11—first support member; 111—fixed hole; 12—second support member; 121—first expansion plate; 1211—first threaded hole; 122—recess; 1221—third threaded hole; 2—second support assembly; 21—third support member; 211—connection hole; 212—third expansion plate; 2121—fourth threaded hole; 22—fourth support member; 221—second expansion plate; 2211—second threaded hole; 3—computer case.

DESCRIPTION OF EMBODIMENTS

The following will provide a clear and complete description of the technical solution in the embodiments of the present application, combined with the accompanying drawings. Obviously, the embodiments described are only a part of the embodiments of the present application, not all of them. Based on the embodiments in this application, all other embodiments obtained by those skilled in the art without creative work are within the protection scope of this application.

Figure 1:
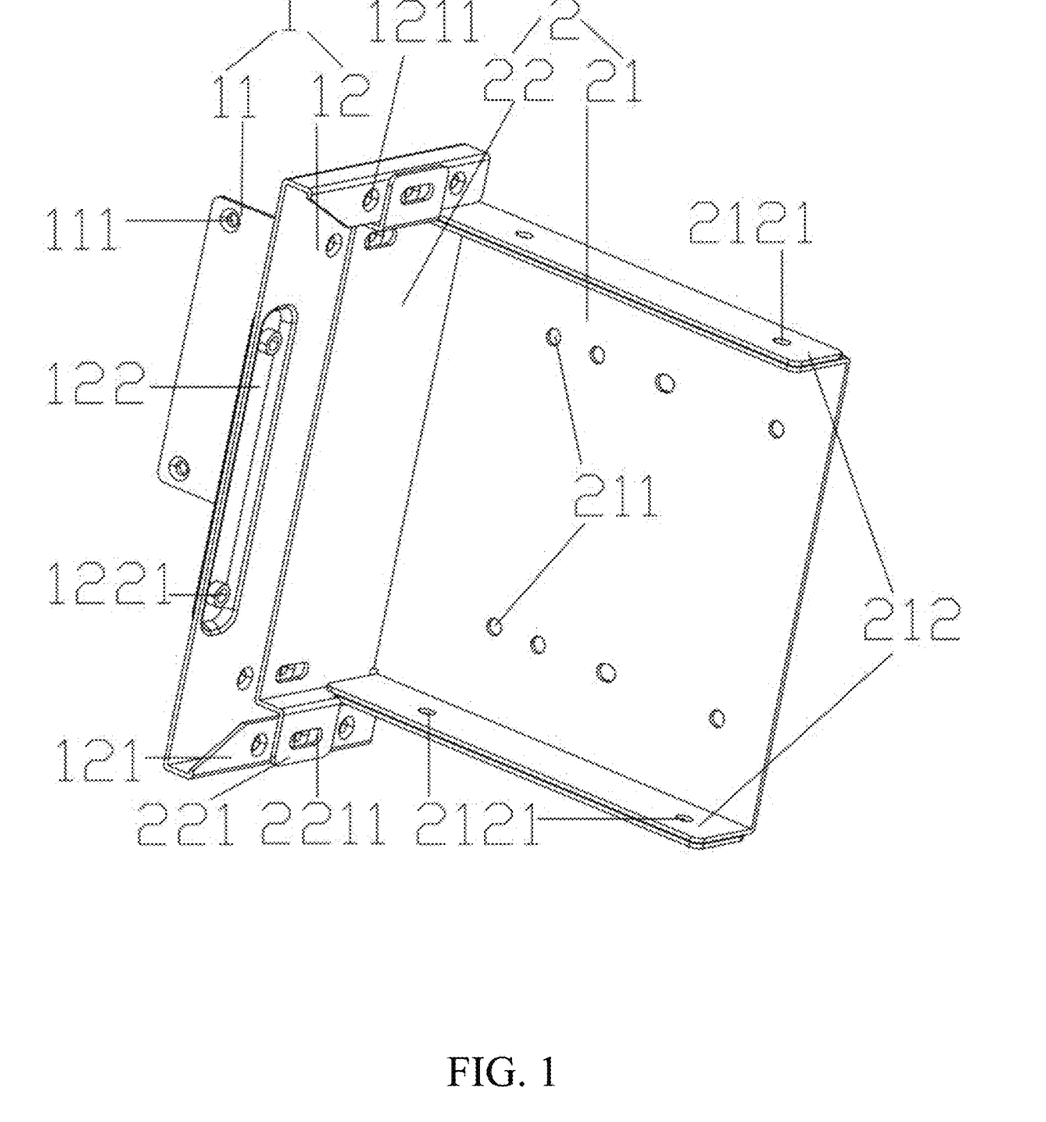
FIG. 1 is a first perspective view of a graphics card support assembly provided by the present disclosure.
Figure 2:
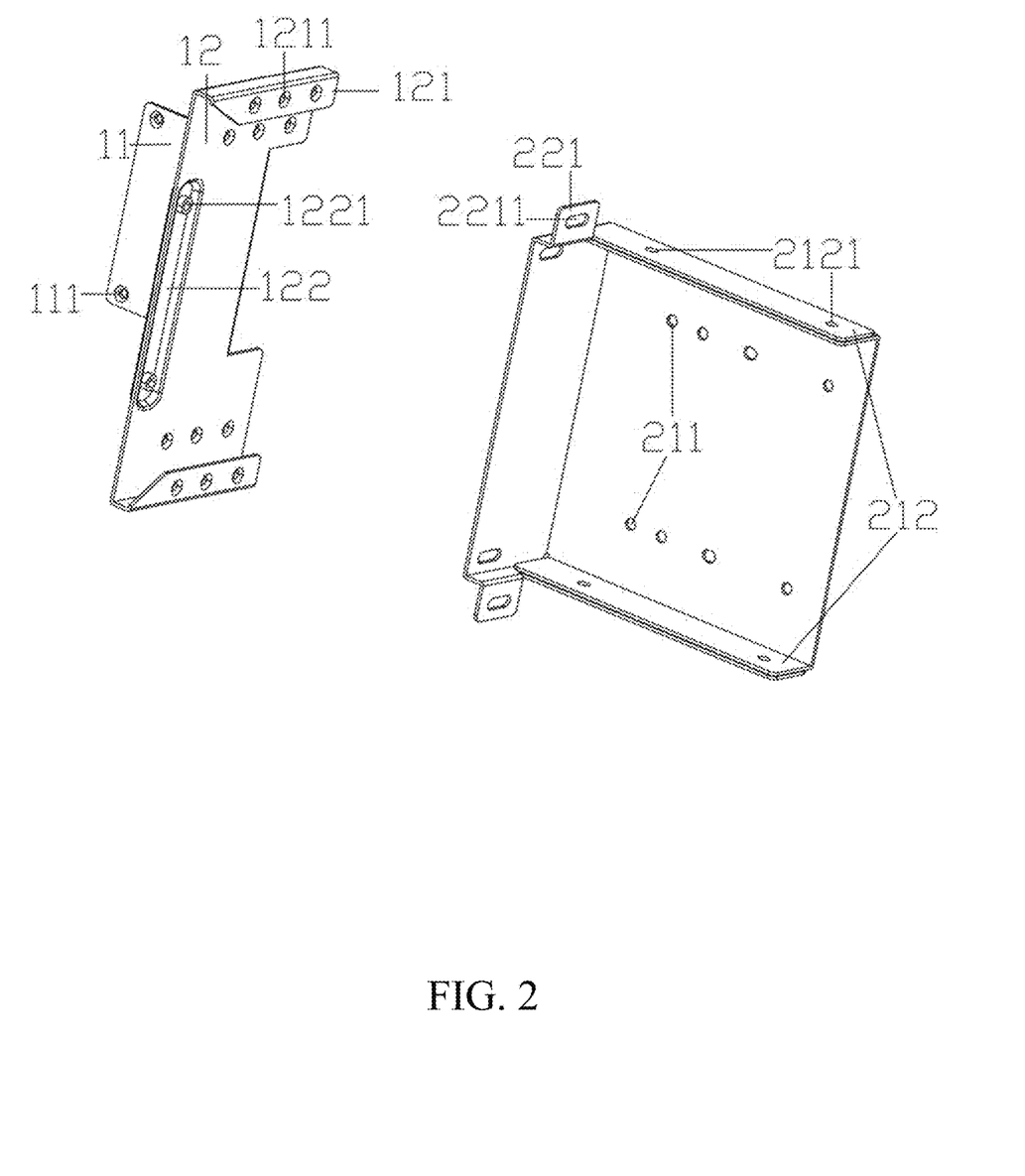
FIG. 2 is an exploded view of FIG. 1.
Figure 3:
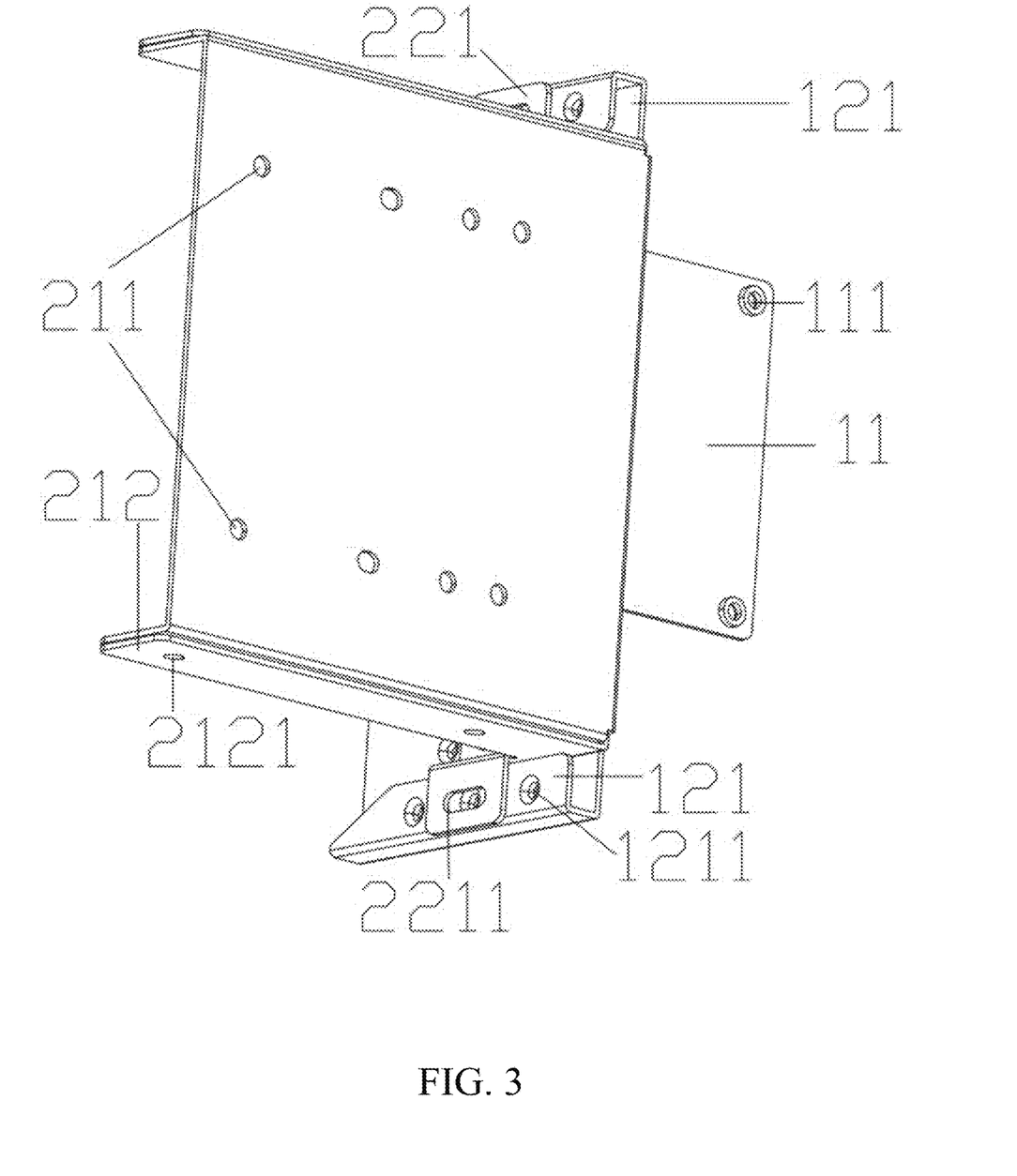
FIG. 3 is a second perspective view of the graphics card support assembly provided by the present disclosure.
Figure 9:
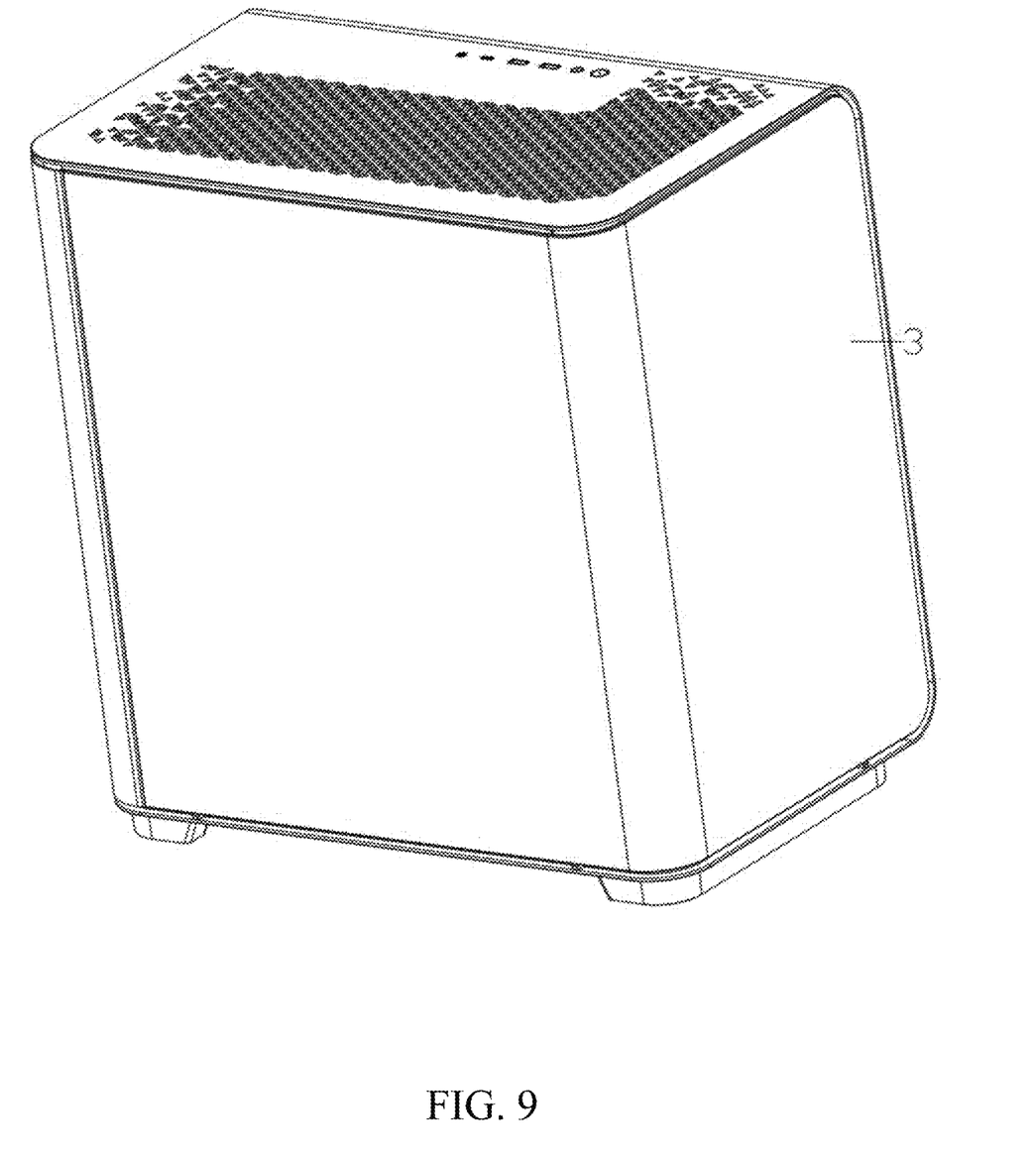
FIG. 9 is a perspective view of the computer case containing graphics card support assembly.

Referring to FIGS. 1 and 9, the present disclosure provides a graphics card support assembly, including a first support assembly 1 and a second support assembly 2. The first support assembly 1 includes a first support member 11 and a second support member 12 fixedly connected to the first support member 11. Two ends of the second support member 12 are provided with first expansion plates 121, and each first expansion plate 121 is provided with at least two first threaded holes 1211. The second support assembly 2 includes a third support member 21 and a fourth support member 22 connected to the third support member 21 to form an "L"-shaped structure. The fourth support member 22 extends from the first expansion plate 121 to form a second expansion plate 221, and the second expansion plate 221 is provided with second threaded holes 2211; where the first support assembly 1 and the second support assembly 2 are movably connected by bolts passing through the first threaded holes 1211 and the second threaded holes 2211. The graphics card support assembly is located at one end of the graphics card on a computer case 3, thereby serving to support the graphics card. The second support assembly 2 is movably connected to the first support assembly 1, allowing the graphics card support assembly to adapt to different specifications of graphics cards.

In an implementation mode, first reinforcement holes are provided on two sides of the second support member 12, and second reinforcement holes are provided on two sides of the fourth support member 22. The first reinforcement holes and second reinforcement holes are connected by bolts to further reinforce the first support assembly 1 and the second support assembly 2.

In some embodiments, the first threaded holes 1211 on two ends of the first expansion plate 121 are symmetrically arranged. The second threaded holes 2211 on two ends of the second expansion plate 221 are symmetrically arranged to correspond to the first threaded holes 1211, thereby allowing the first support assembly 1 to better match with the second support assembly 2.

In some embodiments, there are 3-5 first threaded holes 1211 that are equidistantly provided on two ends of the first expansion plate 121. The second support assembly 2 is connected to different first threaded holes 1211 to achieve a movable connection at different positions on the first support assembly 1, thereby matching different sizes of graphics cards and providing better fixation for different sizes of graphics cards.

Figure 4:
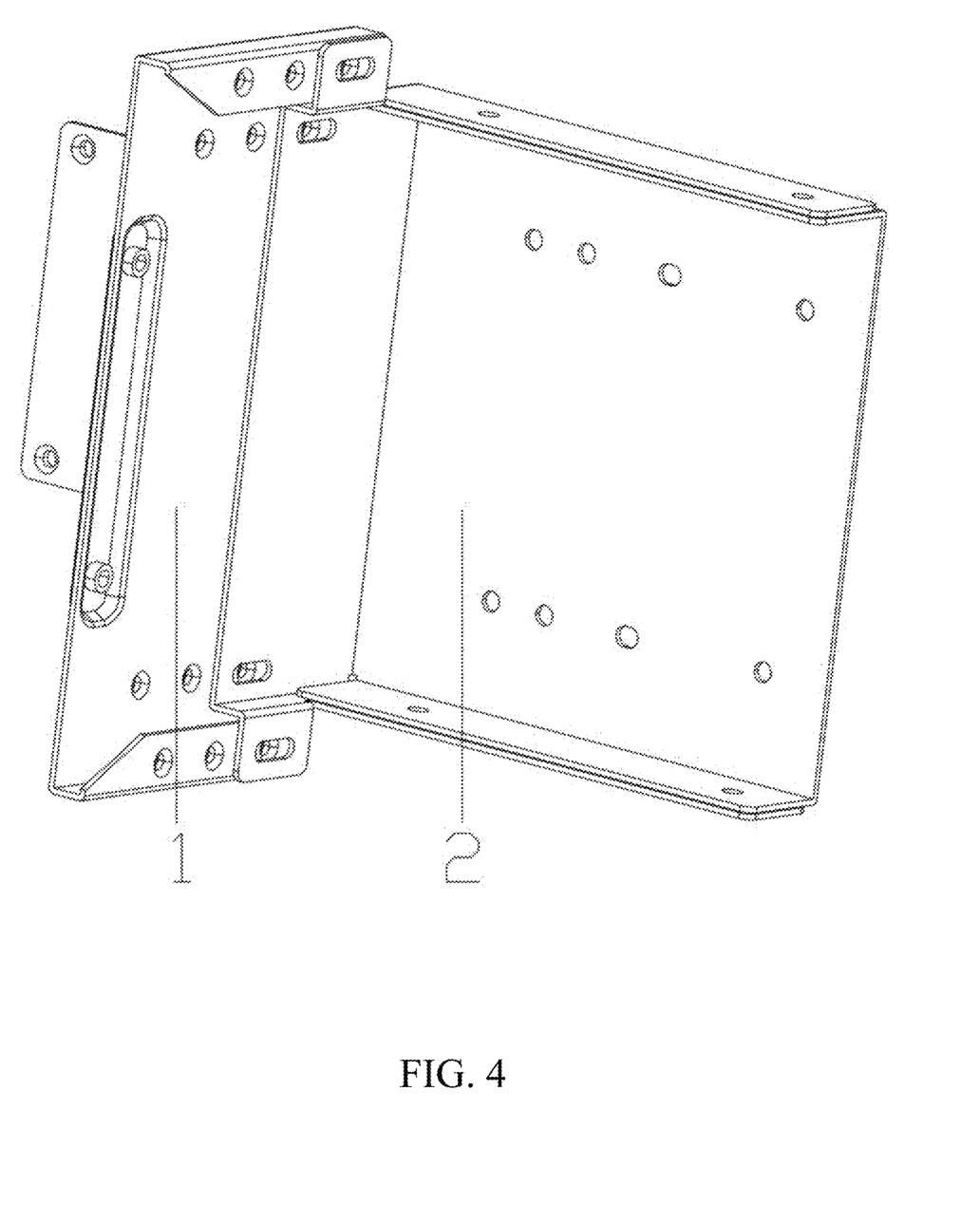
FIG. 4 is a perspective view of a first combination of the graphic card support assembly.
Figure 5:
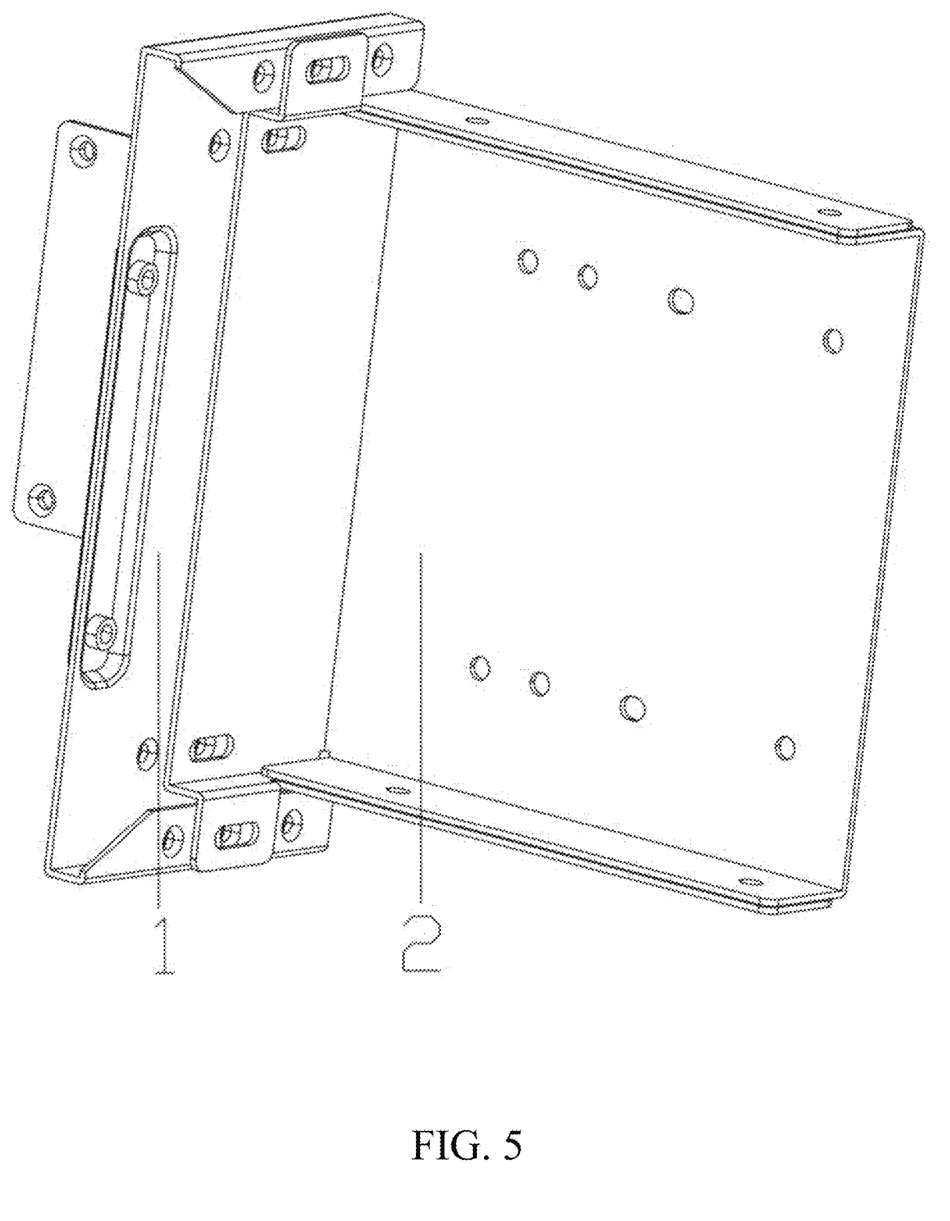
FIG. 5 is a perspective view of a second combination of the graphics card support assembly.
Figure 6:
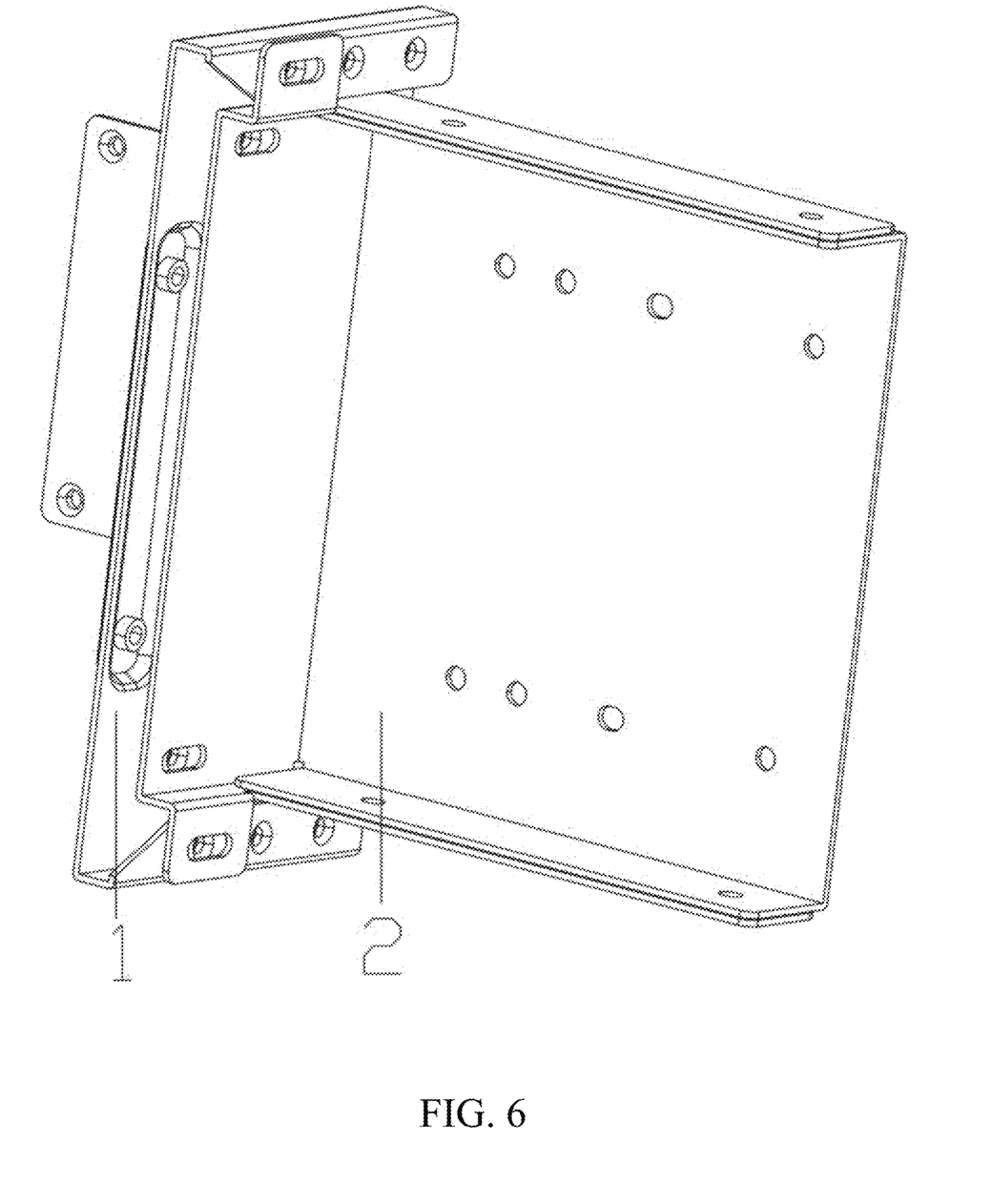
FIG. 6 is a perspective view of a third combination of the graphics card support assembly.
Figure 7:
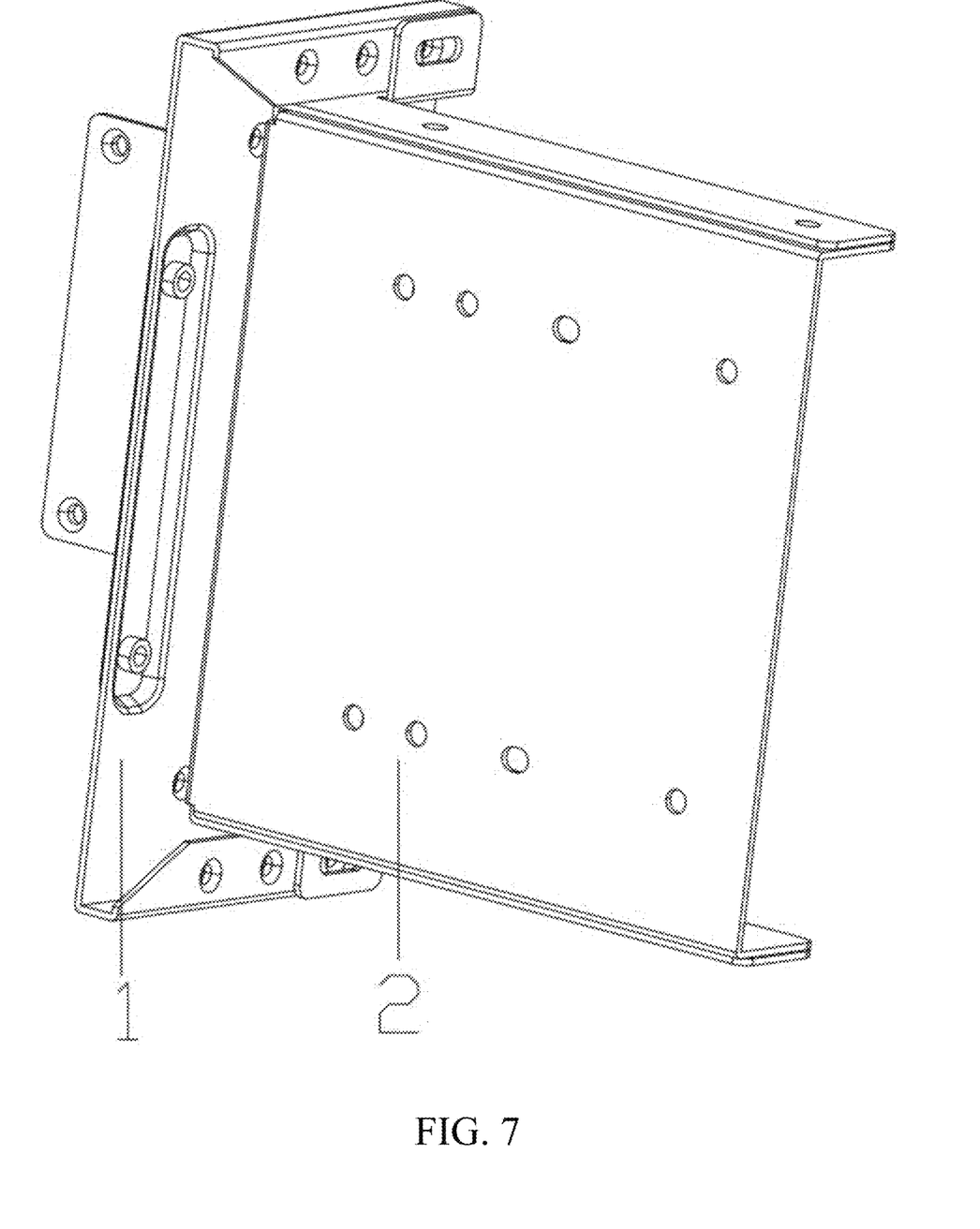
FIG. 7 is a perspective view of a fourth combination of graphics card support assembly.

In some embodiments, as shown in FIGS. 4-7, the second support assembly 2 is connected to the first support assembly 1 in a "⏋" direction or in a "⎾" direction. As shown in FIGS. 4 to 6, the second support assembly 2 is arranged in the "⏋" direction on the first threaded holes 1211 at different positions on the first support assembly 1. As shown in FIG. 7, the second support assembly 2 is connected to the first support assembly 1 in a "⎾" direction. By connecting the second support assembly 2 to the first support assembly 1 in different directions, the graphics card support assembly can fixedly support more graphics cards of different sizes.

In some embodiments, the first support member 11 is provided with a fixed hole 111, and the first support member 11 is fixedly connected to the computer case 3 through the fixed hole 111. The first support member 11 is a sheet-like rectangular structure, with two fixed holes 111 located at the two corners of the first support member 11 away from the second support member 12. The fixed holes 111 and corresponding holes on the computer case 3 are bolted to fix the graphics card support assembly.

In some embodiments, the second support member 12 is provided with a recess 122, and the recess 122 is provided with a third threaded hole 1221. The recess 122 is in a shape of a long strip and is located in a middle of one side of the second support member 12. The third threaded hole 1221 is located at two ends of the recess 122, with a distance of 6 cm to 10 cm between the third threaded holes 1221. The graphics card support assembly is fixed by bolts passing through the third threaded hole 1221 and corresponding holes on the computer case 3. The fixed hole 111 and the third threaded hole 1221 are used in combination to more stably fix the graphics card support assembly to the computer case 3 from different directions.

In some embodiments, the third support member 21 is symmetrically provided with two sets of connection holes 211 with a spacing of 3 cm to 7 cm. The connection holes 211 and corresponding holes on the graphics card are supported and fixed by bolts. The symmetrical arrangement of the connection holes 211 ensures that when the second support assembly 2 is connected to the first support assembly 1 in the "⏋" or "⎾" direction, the two sets of connection holes 211 can be connected to the corresponding holes on the graphics card. Providing with the two sets of connection holes 211 allows a user to adjust the graphics card connection to any set of connection holes 211 according to his own preferences or a space of the computer case 3. The two sets of connection holes 211 can simultaneously connect two graphics cards, rendering the graphics card support assembly compatible with the computer case that requires the insertion of two graphics cards.

In some embodiments, there are third expansion plates 212 on two sides of the third support member 21 that are perpendicular to the same plane as the third support member 21. For some graphics cards with larger thickness, they are directly placed on the third extension plate 212 located at a lower end of the third support member 21 to support the graphics card.

In some embodiments, the second support assembly 2 is formed by bending an integral profile to form the third support member 21, the fourth support member 22, the second expansion plate 221, and the third expansion plate 212. The third expansion plate 212 is provided with a fourth threaded hole 2121. The integrated design of the second support assembly 2 renders it more beautiful and the overall structure more stable. During the processing, only the profile needs to be bent, without the need for other screws or welding treatments. The graphics card is fixed to the graphics card support assembly by bolts passing through the fourth threaded hole 2121 and the corresponding hole on the graphics card.

Figure 8:
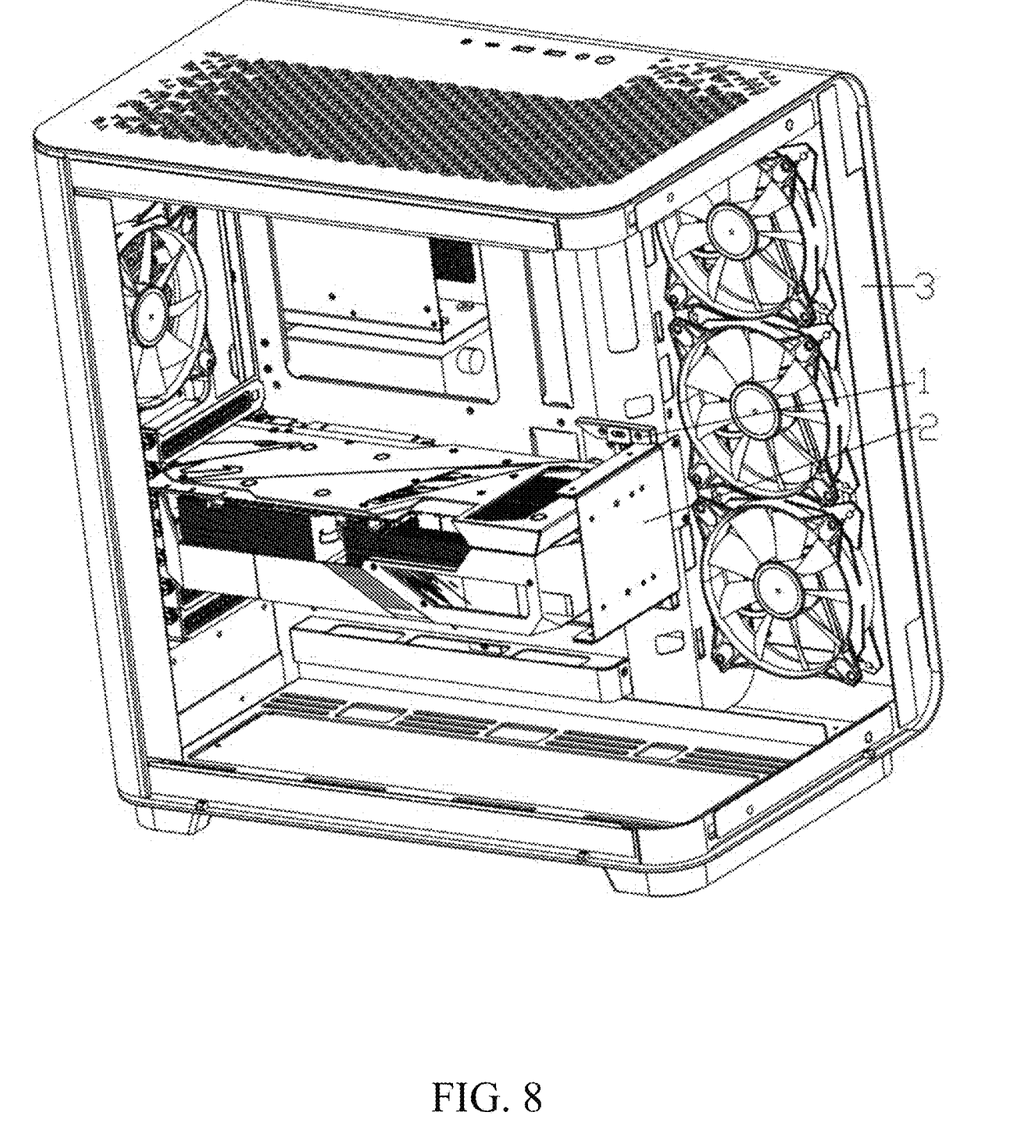
FIG. 8 is a perspective view of a computer case containing graphics card support assembly.

As shown in FIGS. 8 and 9, a computer case 3 includes the aforementioned graphics card support assembly. By providing the graphics card support assembly in the computer case 3, it is possible to equip it with a faster running graphics card, thereby improving the performance of the computer case 3. The computer case panel arranged relative to the graphics card is made of transparent material, rendering the computer case 3 visually appealing. The setting of the graphics card support assembly meets the needs of computer case decoration enthusiasts to place heavy decorations such as figurines on the graphics card without affecting the connection between the graphics card and the motherboard, rendering the computer case 3 more beautiful, thereby increasing the sales of graphics card support assembly and the computer case 3.

Specific working way: in an initial state, the computer case 3 is not equipped with a graphics card support assembly, and the first support assembly 1 and the second support assembly 2 are not connected together; taking one graphics card inside the computer case 3 as an example, the second support assembly 2 is first connected to the first support assembly 1 in the "]" direction, and then the first support assembly 1 and the second support assembly 2 are placed as a whole on one side of the graphics card. A position relationship between the first support assembly 1 and the computer case 3 and a position relationship between the second support assembly 2 and the graphics card are manually adjusted, so that the fixed hole 111 coincides with the corresponding hole on the computer case 3, the third threaded hole 1221 coincides with the corresponding hole on the computer case 3, and the connection hole 211 coincides with the corresponding hole on the graphics card. Then the first threaded holes 1211 and the second threaded holes 2211 are adjusted to render them coincide. If the first threaded holes 1211 and the second threaded holes 2211 cannot coincide all the time, the second support assembly 2 is reversed so that the second support assembly 2 is connected to the first support assembly 1 in the direction of "[", and then the first threaded holes 1211 and the second threaded holes 2211 are adjusted to render them coincide. After determining the positions of the computer case 3, the graphics card support assembly, and the graphics card, bolts are used to pass through the overlapping fixed holes 111 and corresponding holes on the computer case 3, the overlapping third threaded holes 1221 and corresponding holes on the computer case 3, respectively, to complete the fixation of the first support member 11 on the computer case 3. Then, bolts are used to pass through the overlapping first threaded holes 1211 and second threaded holes 2211 to complete the fixation of the second support assembly 2 on the first support assembly 1. Finally, bolts are used to pass through the overlapping connection holes 211 and corresponding holes on the graphics card to complete the fixation of the graphics card on the second support assembly 2, thereby connecting the graphics card to the graphics card support assembly.

In a description of the embodiments of the present disclosure, it should be understood that directional or positional relationship indicated by terms "up", "down", "front", "back", "left", "right", "straight", "horizontal", "center", "top", are based on a directional or positional relationship shown in the accompanying drawings, only for a convenience of describing the present disclosure and simplifying the description, and does not indicate or imply that the device or component referred to must have a specific orientation, be constructed and operated in a specific orientation, and therefore cannot be understood as a limitation of the present disclosure. "Inner side" refers to an internal or enclosed area or space. "Peripheral" refers to an area around a specific component or region.

In a description of the embodiments of the present disclosure, terms "first", "second", "third", and "fourth" are only used for a descriptive purpose and cannot be understood as indicating or implying relative importance or implying the number of technical features indicated. Therefore, the features that are limited to "first", "second", "third", and "fourth" may explicitly or implicitly include one or more of these features. In the description of the present disclosure, unless otherwise specified, the meaning of "multiple" refers to two or more.

In the description of the embodiments of the present disclosure, it should be noted that unless otherwise specified and limited, terms "installation", "connection to", "connection with", and "assembly" should be broadly understood, for example, it can be a fixed connection, a detachable connection, or an integrated connection; it can be directly connected, indirectly connected through an intermediate medium, or connected internally between two components. For those skilled in the art, the specific meanings of the above terms in the present disclosure can be understood in specific situations.

Although the embodiments of the present disclosure have been shown and described, it will be understood by those skilled in the art that various changes, modifications, substitutions, and variations can be made to these embodiments without departing from the principles and spirit of the present disclosure. The scope of the present disclosure is limited by the appended claims and their equivalents.

What is claimed is:

1. A graphics card support assembly, comprising:
a first support assembly, which comprises a first support member and a second support member fixedly connected to one side of the first support member, two ends of the second support member are provided with first expansion plates, and each first expansion plate is provided with at least two first threaded holes; and
a second support assembly, which comprises a third support member and a fourth support member connected to the third support member to form an "L"-shaped structure;
the fourth support member is provided with a second expansion plate corresponding to the first expansion plates, and the second expansion plate is provided with second threaded holes;
wherein the first support assembly and the second support assembly are movably connected by bolts passing through the first threaded holes and the second threaded holes;
wherein the second support member is provided with a recess, and the recess is provided with a third threaded hole.

2. The graphics card support assembly according to claim 1, wherein the first threaded holes on the first expansion plates at two ends are symmetrically arranged.

3. The graphics card support assembly according to claim 2, wherein there are 3-5 first threaded holes that are equidistantly arranged on the first expansion plates at two ends.

4. The graphics card support assembly according to claim 1, wherein the second support assembly is connected to the first support assembly in a "]" direction or a "[" direction.

5. The graphics card support assembly according to claim 1, wherein the first support member is provided with a fixed hole, and the first support member is fixedly connected to a computer case through the fixed hole.

6. The graphics card support assembly according to claim 1, wherein the third support member is symmetrically provided with two sets of connection holes with a spacing of 3 cm to 7 cm.

7. The graphics card support assembly according to claim 1, wherein a third expansion plate is provided on two sides of the third support member perpendicular to the same plane as the third support member.

8. The graphics card support assembly according to claim 7, wherein the second support assembly is an integral formed profile bent to form the third support member, the fourth support member, the second expansion plate, and the third expansion plate;
the third expansion plate is provided with a fourth threaded hole.

9. A computer case, comprising the graphics card support assembly according to claim 1.

\* \* \* \* \*